United States Patent [19]

Schauwecker

[11] Patent Number: 5,011,322
[45] Date of Patent: Apr. 30, 1991

[54] BALL JOINT

[75] Inventor: Friedrich Schauwecker, Pfullingen, Fed. Rep. of Germany

[73] Assignee: Robert Bosch GmbH, Stuttgart, Fed. Rep. of Germany

[21] Appl. No.: 379,805

[22] Filed: Jul. 13, 1989

[30] Foreign Application Priority Data

Sep. 1, 1988 [DE] Fed. Rep. of Germany ... 8811059[U]

[51] Int. Cl.⁵ ............................................. F16C 11/06
[52] U.S. Cl. .................................... 403/141; 403/142; 403/289
[58] Field of Search ............... 403/141, 142, 143, 135, 403/122, 289, 290

[56] References Cited

U.S. PATENT DOCUMENTS

| 3,856,422 | 12/1974 | Trefry | 403/122 |
| 4,084,913 | 4/1978 | Schenk | 403/141 |
| 4,111,570 | 9/1978 | Morel | 403/141 X |
| 4,118,131 | 10/1978 | Schnitzius | 403/141 X |
| 4,499,785 | 2/1985 | Bennett et al. | 403/141 X |
| 4,694,705 | 9/1987 | Frankhouse et al. | 403/141 X |

Primary Examiner—Peter M. Cuomo
Attorney, Agent, or Firm—Michael J. Striker

[57] ABSTRACT

A ball joint comprising a ball stud including a shank and a ball formed at one end of the shank and a ball socket for receiving the ball and including resilient arms having an outer surface corresponding to the outer surface of the ball and engaging the same and ridges located internally of the ball socket for preventing displacement of the ball out of the ball socket.

6 Claims, 2 Drawing Sheets

BALL JOINT

BACKGROUND OF THE INVENTION

The invention relates to a ball joint, in particular, to a ball joint for head lamp adjusting devices of motor vehicles. Prior art discloses a ball joint for use in head lamp adjusting devices of motor vehicles and comprising a ball stud having a shank with a ball at one end thereof and a ball socket having resilient arms with outer surfaces corresponding to the outer surface of the ball and engaging the same. In this prior art ball joint, a retaining ring is pushed over the resilient arms to prevent expansion of the arms and thereby inadvertent displacement of the ball stud out of the socket. Using such a retaining ring increases costs of production of ball joints.

SUMMARY OF THE INVENTION

The object of the invention is to eliminate such retaining ring and reduce costs of production of the ball joint of the foregoing type. The object of the invention is achieved by providing at a transition surface of the ball stud between the shank and the ball an annular notch that engages ridges projecting from the outer surface of the resilient arms. According to another development of the invention, the object of the invention is achieved by providing in the ball socket in addition to the resilient arms, form-stable bearing member for absorbing first axial and radial force components. The outer surface of the resilient arms, which absorbs second axial and radial force components, engages the half of the outer surface of the ball which lies opposite the bearing member. The resilient arms are made resiliently deflectable transverse to the radial plane of the bearing member. Providing in addition to the bearing member on the transition surface of the ball stud between the shank and the ball a notch that engages ridges formed on the resilient arms results in that a very high force is required to displace the ball stud out of the socket.

The resilient arms may extend at an acute angle to the radial plane of the bearing member formed on a part forming the resilient arms. With this arrangement, a small force is required during assembly of the ball joint. However, this small force insures a reliable engagement of the ball stud with the socket and that a rather high force would be needed to displace the ball stud out of the socket.

The present invention as to its construction so to its mode of operation, together with additional objects and advantages thereof, will be best understood from the following description of the preferred embodiments with reference to the accompanying drawings.

DESCRIPTION OF THE PREFERRED EMBODIMENTS

Figure 1:
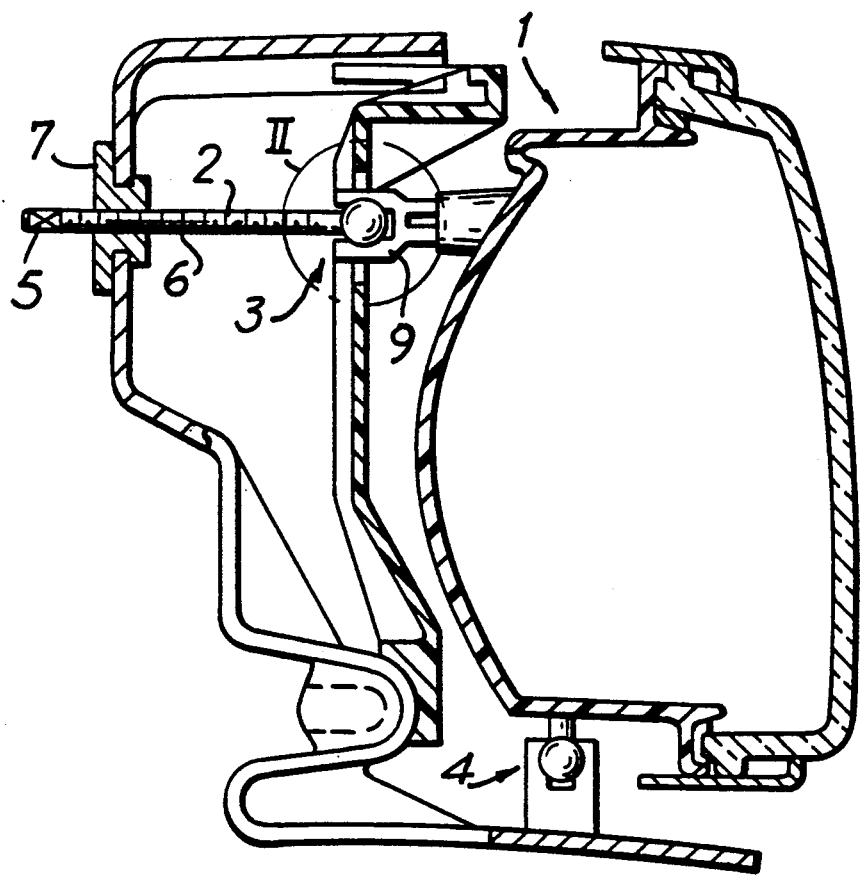
FIG. 1 shows a head lamp for a motor vehicle.

FIG. 1 shows a head lamp for a vehicle. The head lamp comprises a reflector 1 pivotably supported by at least one stationary ball joint 4 and by at least one adjustable ball joint 3. The adjustable ball joint includes a ball stud 2 and a ball socket 9.

The ball stud comprises a threaded shank 6 screwed in a threaded bushing 7 supported in a vehicle body and the threaded shank 6 is connected at an end 5 thereof with an adjusting device (not shown). On the other end, a ball 10 is formed which is supported in a ball socket 9.

Figure 2:
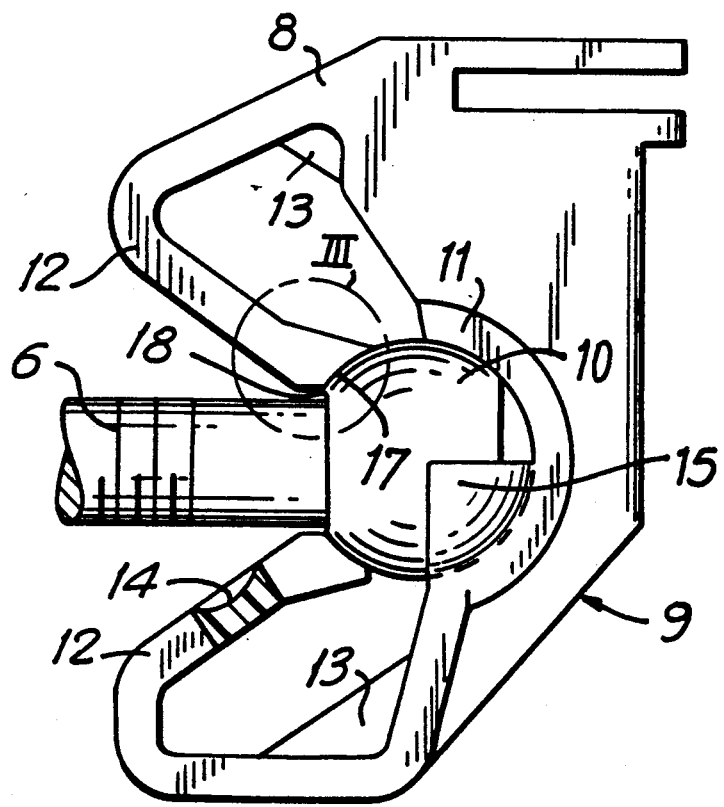
FIG. 2 shows a side view of a first embodiment of a ball joint according to the invention.

As shown in FIG. 2, the ball socket 9 comprises a shaped part 8 made of a resilient material. The part 8 is so designed that it can be secured to the reflector 1 by very simple means. The ball socket 9 comprises a form-stable bearing member 11 and two diametrically opposite resilient arms 12. The bearing member 11 comprises two diametrically opposite bearing shells 15 which have approximately a shape of a quadrant of a spherical surface. The resilient arm 12 extends from the shaped part 8 in such a manner that only end portions of the arms are resiliently deflectable because the connection of the arms 12 with the shaped part 8 is reinforced with stiffening ribs 13. The resilient arms form with the radial plane of the bearing member 11 an angle of 55° and deflect transverse to the radial plane of the bearing member 12. The resilient arms have their ends directed to the bearing member. The ball 10 has an outer surface corresponding to the adjacent outer surface 17 of the resilient arm 12. The resilient arms 12 engage with their surfaces 17 the half of the ball 10 which lies opposite the bearing member 11 and hold the ball in the bearing member without play. The ball 10 is supported in the bearing member by bearing shells 15 and, therefore, cannot move in the radial plane of the bearing member when loaded.

The angular displacement of the ball stud 2 in the plane defined by both resilient arms 12 is restricted by the arms themselves. Thus, a large angular displacement takes place in a plane perpendicular to the plane defined by the resilient arms. To effect a displacement of the ball stud 2 in the ball socket 9, the ball 10 engages the resilient arms 12 which are provided with a respective recess 14 along the insertion direction of the ball for centering and guiding the ball. Upon advancing the ball stud in the direction of the bearing portion, the resilient arms deflect, and the ball slides into the bearing member. When the main diameter of the ball passes through the arms 12, they engage the half of the ball which is opposite the bearing member and hold the ball 10 in the bearing member 11. Displacement of the ball stud 2 out of the ball socket 9 by forces resulting from a bias applied by the outer surfaces 17 of the resilient arms in the direction of the bearing member is, thus, prevented.

Figure 3:
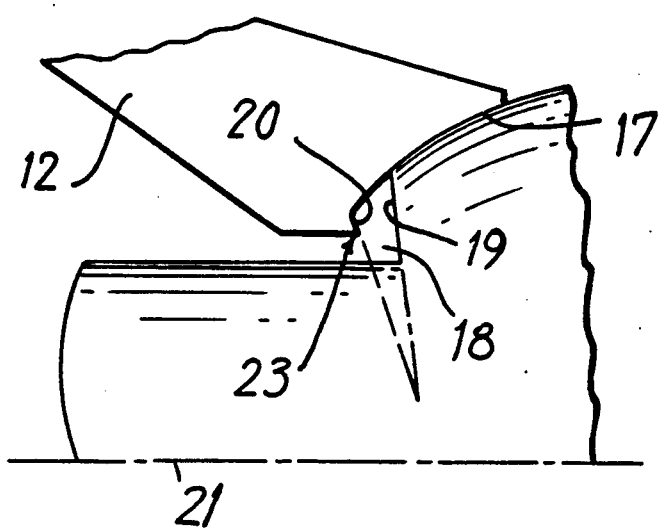
FIG. 3 shows an enlarged view of a portion of the ball joint shown in FIG. 2.

As shown in FIG. 3, the ball stud may be provided at the transition surface between the shank 6 and the ball 10 with an annular notch 18 so that an annular shoulder 19 which is spaced from the axis 21 of the shank, is formed and which extends to the axis 21 at an angle of less than 90°. The resilient arms 12 are provided with annular shoulders 20 projecting from the respective outer surfaces in the direction of the bearing member and having ridges 23 which extend into the notch 18. The ridges 23 are spaced from the shoulder 19 so that the ball stud is able to make a predetermined angular movement until the annular shoulder 19 engages the annular shoulder 20. The angle at which the annular shoulder 20 extends to the axis 21 in the direction of the ball is so selected that the shoulders 20 of the arms 12 abut the shoulder 19 of the ball upon a predetermined angular displacement of the ball. Thereby sliding of the resilient arm off the outer surface of the ball upon a large axial loading is prevented because the respective shoulders abut each other.

Figure 4:
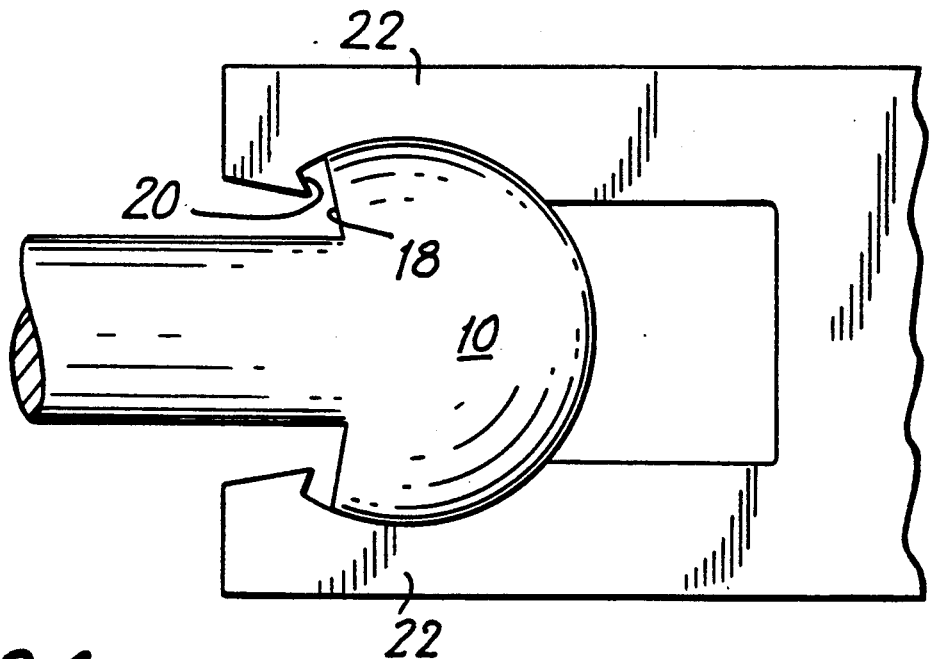
FIG. 4 shows a side view of a second embodiment of the ball joint according to the present invention.

In another embodiment of the ball joint shown in FIG. 4, the ball socket is formed only of resilient arms 22. A bearing member 11 of FIG. 2 is absent in FIG. 4. To prevent displacement of the ball 10 out of the resilient arms 22 under axial load, the ball stud 2 in the transition area between the shank 6 and ball 10 has a notch 18 which engages ridges formed by shoulders 20 formed on the outer surfaces of the arms and which are similar to ridges 23 of the embodiment shown in FIG. 2.

In a technically equivalent manner can the shank of the ball stud 2 extend through an opening in the bearing member 11. In such an embodiment, the notch 18 is formed on the half of the ball spaced from the bearing member 11 in the region of engagement of the resilient arm with the ball so that the ridges 23 permit a limited pivotal movement and engage the notch of the ball stud to prevent displacement of the ball out of the socket.

While the invention has been illustrated and described as embodied in a ball joint for head lamp shifting devices of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A ball joint comprising a ball stud including a shank and a ball formed at one end of said shank and having an outer surface; a ball socket for receiving said ball and including resilient arm means having an outer surface corresponding to said outer surface of said ball and engaging the same, said resilient arm means having on said outer surface thereof ridges and said ball stud having a substantially flat annular shoulder defining a transistion surface extending between said shank and said ball, said ridges engaging said annular shoulder upon a predetermined angular displacement of said ball to prevent displacement of said ball stud out of the socket.

2. A ball joint according to claim 1, wherein said ball stud has a longitudinal axis, said annular shoulder extending substantially transverse to the longitudinal axis of said ball stud.

3. A ball joint according to claim 1 including a formstable bearing member for receiving first axial and radial force components, said resilient arm means comprising at least two resilient arms formed integrally with said ball socket, located opposite each other, said outer surfaces of said resilient arms receiving second axial and radial force components and engaging a half of said outer surface of said ball which lies opposite said bearing member, said resilient arms being deflectable transverse to a radial plane of said bearing member.

4. A ball joint according to claim 3, wherein said resilient arms extend at an acute angle to said radial plane of said bearing member.

5. A ball joint according to claim 4, wherein said acute angle is 55°.

6. A ball joint according to claim 3, wherein said bearing member comprises at least two opposite bearing shells formed each by an outer surface of a partial sphere.

* * * * *